(12) United States Patent
Louise-Babando et al.

(10) Patent No.: US 9,052,198 B2
(45) Date of Patent: Jun. 9, 2015

(54) INTERACTIVE DIALOG DEVICE BETWEEN AN OPERATOR OF AN AIRCRAFT AND A GUIDANCE SYSTEM OF SAID AIRCRAFT

(71) Applicants: Pascale Louise-Babando, Toulouse (FR); Thierry Bourret, Toulouse (FR); Claire Ollagnon, Montpellier (FR); Nicolas Chauveau, Montpellier (FR)

(72) Inventors: Pascale Louise-Babando, Toulouse (FR); Thierry Bourret, Toulouse (FR); Claire Ollagnon, Montpellier (FR); Nicolas Chauveau, Montpellier (FR)

(73) Assignee: Airbus Operations (S.A.S.), Toulouse (FR)

( * ) Notice: Subject to any disclaimer, the term of this patent is extended or adjusted under 35 U.S.C. 154(b) by 121 days.

(21) Appl. No.: 13/687,729

(22) Filed: Nov. 28, 2012

(65) Prior Publication Data

US 2013/0135202 A1     May 30, 2013

(30) Foreign Application Priority Data

Nov. 29, 2011    (FR) ..................................... 11 60884

(51) Int. Cl.
     *G06F 3/041*         (2006.01)
     *G06F 3/033*         (2013.01)
     *G01C 23/00*        (2006.01)
     *G06F 3/0484*       (2013.01)

(52) U.S. Cl.
     CPC .............. *G01C 23/00* (2013.01); *G06F 3/0412* (2013.01); *G06F 3/033* (2013.01); *G06F 3/0484* (2013.01)

(58) Field of Classification Search
     CPC ......... G06F 3/0484; G06F 3/01; G06F 3/033; G06F 3/0412; G06F 3/0416; B64C 19/00; G01C 23/00
     USPC ................. 345/156–173, 649–650, 660–661; 340/947–980; 701/3–14
     See application file for complete search history.

(56) References Cited

U.S. PATENT DOCUMENTS

| | | |
|---|---|---|
| 812,174 A | 2/1906 | Grundal |
| 4,538,229 A | 8/1985 | Baltzer et al. |
| 4,807,158 A | 2/1989 | Blanton et al. |
| 5,842,142 A | 11/1998 | Murray et al. |
| 5,936,552 A | 8/1999 | Wichgers et al. |
| 5,978,715 A | 11/1999 | Briffe et al. |
| 6,072,473 A | 6/2000 | Muller et al. |
| 6,085,145 A | 7/2000 | Taka et al. |
| 6,181,987 B1 | 1/2001 | Deker et al. |
| 6,353,734 B1 | 3/2002 | Wright et al. |

(Continued)

FOREIGN PATENT DOCUMENTS

| | | |
|---|---|---|
| EP | 0562929 | 9/1993 |
| EP | 2063227 | 5/2009 |
| FR | 2 694 104 | 1/1994 |

OTHER PUBLICATIONS

French Search Report for FR 1160884 dated Jul. 5, 2012.

(Continued)

*Primary Examiner* — Hong Zhou
(74) *Attorney, Agent, or Firm* — Jenkins, Wilson, Taylor & Hunt, P.A.

(57) ABSTRACT

Interactive dialog device between an operator of an aircraft and a guidance system of the aircraft. The dialog device includes an interaction on a screen which represents, on the one hand, a playback element indicating the value of a guidance setpoint of the guidance system of the aircraft, and on the other hand, a control element which can be grasped and moved along a curve by an operator to modify the value of the guidance setpoint.

12 Claims, 6 Drawing Sheets

(56) References Cited

U.S. PATENT DOCUMENTS

| | | |
|---|---|---|
| 6,573,841 B2 | 6/2003 | Price |
| 6,832,138 B1 | 12/2004 | Straub et al. |
| 6,910,657 B2 | 6/2005 | Schneider |
| D517,435 S | 3/2006 | Yamada |
| 7,307,549 B2 | 12/2007 | Firra |
| D559,260 S | 1/2008 | Noviello |
| D563,977 S | 3/2008 | Carl et al. |
| 7,343,229 B1 | 3/2008 | Wilson |
| D579,458 S | 10/2008 | Nash et al. |
| 7,577,501 B2 | 8/2009 | Tafs et al. |
| D608,793 S | 1/2010 | Canu-Chiesa |
| 7,702,427 B1 | 4/2010 | Sridhar et al. |
| D615,100 S | 5/2010 | Canu-Chiesa |
| 7,751,948 B2 | 7/2010 | Boorman et al. |
| 7,765,061 B1 | 7/2010 | Barber et al. |
| 7,830,275 B2 | 11/2010 | Hiraoka |
| D634,332 S | 3/2011 | Spek |
| 7,996,121 B2 | 8/2011 | Ferro et al. |
| D644,651 S | 9/2011 | Spek |
| D644,652 S | 9/2011 | Spek |
| D644,653 S | 9/2011 | Spek |
| D646,689 S | 10/2011 | Ulliot |
| 8,078,343 B2 | 12/2011 | Ferreira et al. |
| 8,108,087 B2 | 1/2012 | Stone et al. |
| 8,234,068 B1 | 7/2012 | Young et al. |
| 8,290,642 B2 | 10/2012 | Hanson |
| 8,311,686 B2 | 11/2012 | Herkes et al. |
| 8,380,366 B1* | 2/2013 | Schulte et al. ............ 701/3 |
| 8,829,401 B1 | 9/2014 | Lutke et al. |
| 2003/0025719 A1 | 2/2003 | Palmer et al. |
| 2003/0060940 A1 | 3/2003 | Humbard et al. |
| 2003/0112503 A1 | 6/2003 | Lantin |
| 2004/0006412 A1 | 1/2004 | Doose et al. |
| 2004/0056895 A1 | 3/2004 | Hedrick |
| 2004/0260458 A1 | 12/2004 | Park et al. |
| 2005/0065671 A1 | 3/2005 | Horvath et al. |
| 2005/0156777 A1 | 7/2005 | King et al. |
| 2005/0203675 A1* | 9/2005 | Griffin et al. ............ 701/3 |
| 2005/0222766 A1 | 10/2005 | Burch et al. |
| 2005/0261808 A1 | 11/2005 | Artini et al. |
| 2005/0273220 A1 | 12/2005 | Humbard et al. |
| 2006/0132460 A1* | 6/2006 | Kolmykov-Zotov et al. . 345/173 |
| 2006/0164261 A1 | 7/2006 | Stiffler |
| 2007/0129855 A1 | 6/2007 | Colmeau |
| 2007/0182590 A1 | 8/2007 | Younkin |
| 2007/0288129 A1 | 12/2007 | Komer et al. |
| 2008/0046134 A1 | 2/2008 | Bruce et al. |
| 2008/0243318 A1 | 10/2008 | Ferro et al. |
| 2008/0249675 A1 | 10/2008 | Goodman et al. |
| 2009/0070123 A1 | 3/2009 | Wise et al. |
| 2009/0105890 A1 | 4/2009 | Jones et al. |
| 2009/0118997 A1 | 5/2009 | Truitt |
| 2009/0281684 A1 | 11/2009 | Spek |
| 2010/0010958 A1 | 1/2010 | Perrow et al. |
| 2010/0156674 A1* | 6/2010 | Dwyer et al. ............ 340/975 |
| 2010/0161157 A1 | 6/2010 | Guilley et al. |
| 2010/0194601 A1 | 8/2010 | Servantie et al. |
| 2010/0305786 A1 | 12/2010 | Boorman |
| 2010/0324807 A1 | 12/2010 | Doose et al. |
| 2011/0001636 A1 | 1/2011 | Hedrick |
| 2011/0029919 A1* | 2/2011 | Woltkamp ............ 715/810 |
| 2011/0184595 A1 | 7/2011 | Albert |
| 2011/0196599 A1 | 8/2011 | Feyereisen et al. |
| 2011/0199239 A1 | 8/2011 | Lutz |
| 2011/0202272 A1* | 8/2011 | Feyereisen et al. ........ 701/208 |
| 2011/0208374 A1* | 8/2011 | Jayathirtha et al. ........ 701/5 |
| 2011/0213514 A1* | 9/2011 | Baxter ............ 701/14 |
| 2011/0246015 A1 | 10/2011 | Cummings et al. |
| 2011/0264312 A1 | 10/2011 | Spinelli et al. |
| 2011/0313645 A1 | 12/2011 | Shukla |
| 2012/0010765 A1* | 1/2012 | Wilson et al. ............ 701/3 |
| 2012/0105318 A1 | 5/2012 | Nutaro et al. |
| 2012/0116614 A1 | 5/2012 | Torres et al. |
| 2012/0215433 A1 | 8/2012 | Subbu et al. |
| 2012/0253564 A1 | 10/2012 | Noll et al. |
| 2013/0046462 A1 | 2/2013 | Feyereisen et al. |
| 2013/0090841 A1 | 4/2013 | Barraci et al. |
| 2013/0100042 A1* | 4/2013 | Kincaid ............ 345/173 |
| 2013/0179011 A1 | 7/2013 | Colby et al. |
| 2013/0204524 A1 | 8/2013 | Fryer et al. |
| 2013/0211635 A1 | 8/2013 | Bourret |
| 2013/0215023 A1 | 8/2013 | Bourret |
| 2013/0278444 A1 | 10/2013 | Venkataswamy et al. |
| 2014/0081569 A1 | 3/2014 | Agrawal et al. |
| 2014/0200748 A1 | 7/2014 | Porez |
| 2014/0277857 A1 | 9/2014 | Bourret et al. |
| 2014/0309821 A1 | 10/2014 | Poux |

OTHER PUBLICATIONS

French Search Report for FR 1350247 dated Nov. 22, 2013.
Non-Final Office Action for U.S. Appl. No. 13/861,052 dated Feb. 14, 2014.
Final Office Action for U.S. Appl. No. 13/861,052 dated Jun. 16, 2014.
Restriction Requirement for U.S. Appl. No. 13/835,506 dated Mar. 27, 2014.
Restriction Requirement for U.S. Appl. No. 29/449,551 dated Apr. 9, 2014.
Notice of Allowance for U.S. Appl. No. 29/449,551 dated Jul. 18, 2014.
Non-Final Office Action for U.S. Appl. No. 13/835,506 dated Jun. 26, 2014.
Non-Final Office Action for U.S. Appl. No. 13/835,201 dated Jun. 27, 2014.
Interview Summary for U.S. Appl. No. 13/861,052 dated Aug. 5, 2014.
Non-Final Office Action for U.S. Appl. No. 13/834,401 dated Sep. 2, 2014.
Non-Final Office Action for U.S. Appl. No. 13/861,052 dated Sep. 26, 2014.
Notice of Allowance for U.S. Appl. No. 29/449,551 dated Oct. 22, 2014.
Final Office Action for U.S. Appl. No. 13/835,201 dated Nov. 19, 2014.

* cited by examiner

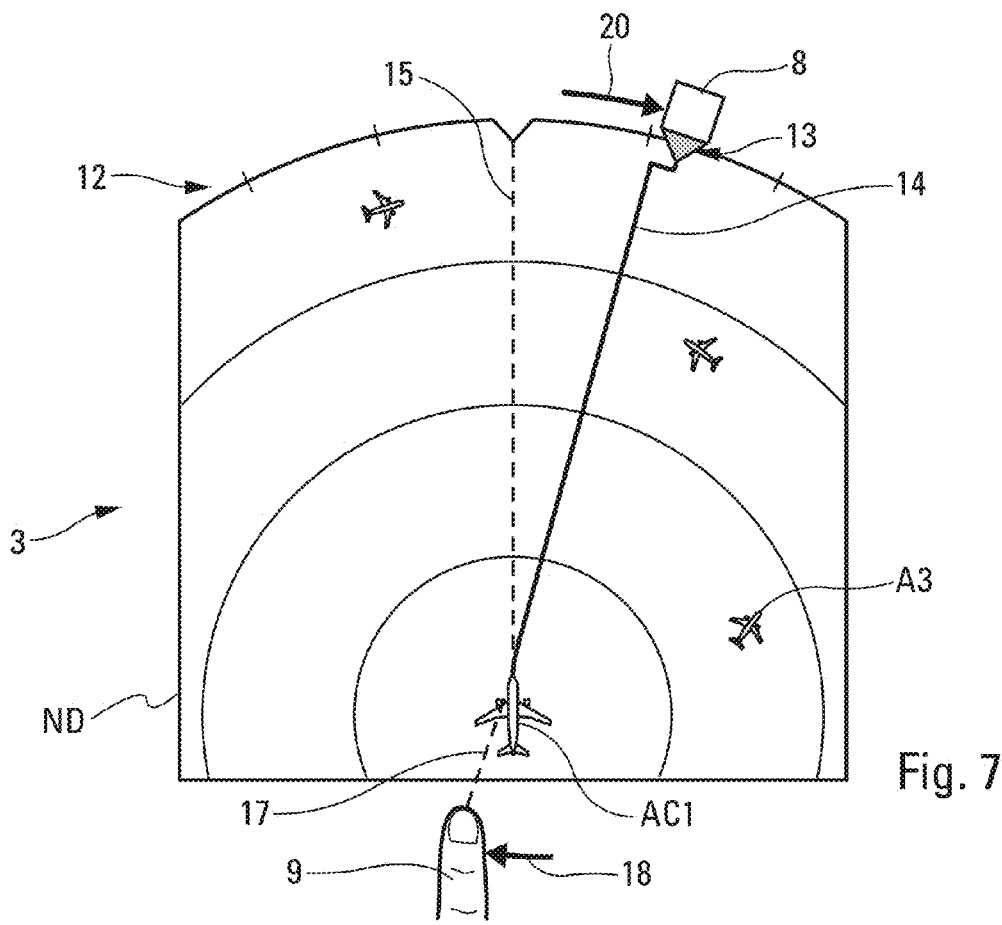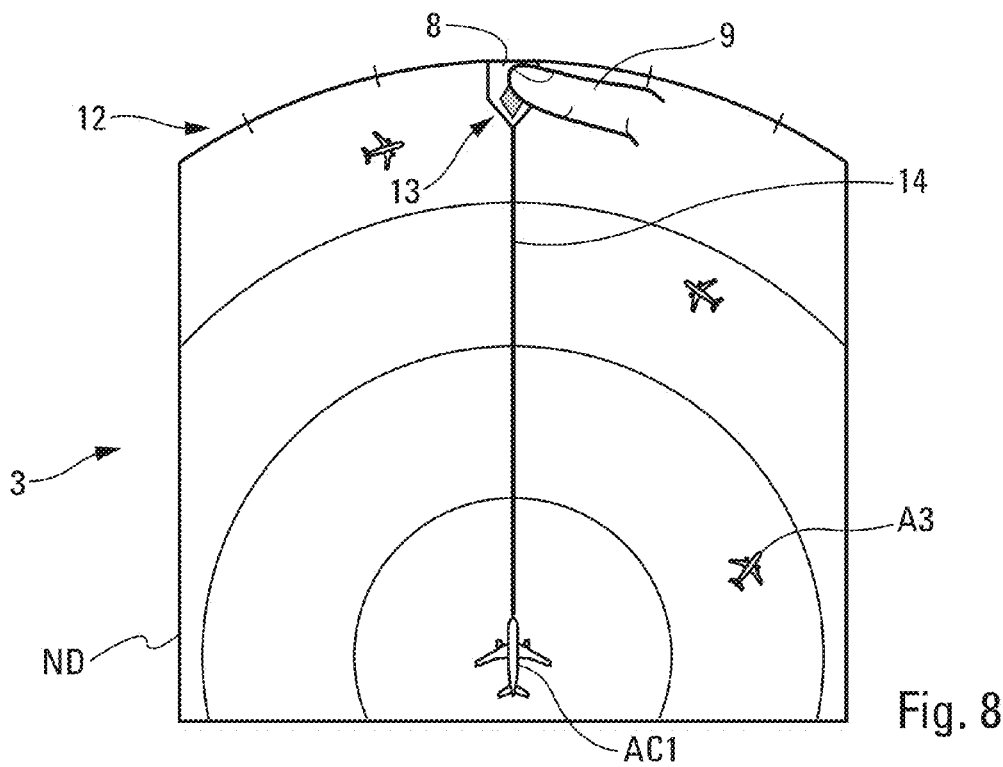

INTERACTIVE DIALOG DEVICE BETWEEN AN OPERATOR OF AN AIRCRAFT AND A GUIDANCE SYSTEM OF SAID AIRCRAFT

CROSS-REFERENCE TO RELATED APPLICATION

This application claims priority to French Patent Application No. 11 60884 filed Nov. 29, 2011, the entire disclosure of which is herein incorporated by reference.

BACKGROUND OF THE INVENTION

The present invention relates to a dialog device for an aircraft, notably a transport airplane, enabling a dialog between an operator of the aircraft, in particular a pilot, and a guidance system of said aircraft.

DESCRIPTION

The airplanes that are provided with a guidance system, namely either a flight director which computes piloting setpoints on the basis of guidance setpoints or an automatic piloting system which makes it possible to follow guidance setpoints automatically, are provided with an item of equipment, called FCU (Flight Control Unit) on airplanes of AIRBUS type and MCP (Mode Control Panel) on airplanes of BOEING type, which enables a pilot of the airplane to enter guidance setpoints into the guidance system.

Generally, the pilot chooses a guidance setpoint, then he or she controls the engagement (activation) of the associated guidance mode, so that it takes into account either the value entered (in a so-called "selected" mode), or a value computed by the system according to various criteria (in a so-called "managed" mode).

More particularly, the pilot can notably:
on the speed axis:
enter a speed (CAS) or Mach setpoint;
give control to the system so as to use a speed or Mach setpoint computed on the basis of certain criteria;
on the lateral axis:
enter a heading (HEADING) or route (TRACK) setpoint;
give control to the system so as to use the route from the predefined flight plan; and
on the vertical axis:
enter an altitude setpoint;
indicate how to reach this altitude setpoint:
by observing a vertical speed or a gradient; or
by optimizing the climb or descent time while observing an air speed; or else
by observing a geometrical vertical profile defined by the system according to certain criteria;
provide a level; and
follow an axis (of approach for example).

These setpoints are taken into account by the guidance system, either directly as soon as their value is modified if the associated mode is active, or after validation (engagement of the associated mode) in the case where another guidance mode is initially engaged. In the latter case, the setpoint is said to be preset before its validation.

For each selection of a setpoint to be reached or to be maintained there is a corresponding guidance mode of the airplane. There is one mode engaged for each axis (speed, lateral, vertical) exclusively. As an illustration, the following modes can be cited:
on the lateral axis:
capture or maintain a heading mode;
capture or maintain a route mode;
join or maintain the trajectory of the flight plan mode;
capture or maintain an approach axis on a horizontal plane mode;
on the vertical axis:
capture or maintain altitude mode;
reach altitude (climb or descent) observing an air speed mode;
climb or descent observing a vertical speed or a gradient mode;
climb or descent observing a geometrical profile or altitude constraints mode; and
capture or maintain the approach axis on a vertical plane mode.

A synthetic summary of the behavior of the guidance system (flight director or automatic piloting system, associated or not with an automatic thrust control) is produced, generally, on the screens displaying the primary flight parameters, of PFD (Primary Flight Display) type, on a panel of FMA (Flight Mode Annunciator) type. This synthetic summary reviews, generally, the guidance modes that are engaged (active) on each axis (speed, lateral, vertical), as well as the guidance modes that are armed, that is to say those which have been requested by the pilot and which will be engaged automatically when conditions for engaging the mode are satisfied. As an example, outside the trajectory of the flight plan, in maintain heading mode converging toward the trajectory of the flight plan with the join or maintain the trajectory of the flight plan mode armed, the latter mode is engaged automatically on approaching the flight plan.

In most airplanes with two pilots, the control unit of the guidance system is situated in the center of the cockpit (above the screens showing the flight parameters) so that both pilots can access it.

This control unit, for example of FCU type, makes it possible:
to select guidance setpoints;
to engage the modes associated with a guidance setpoint (render the mode active), or to request the arming of the mode; and
to change reference (for example heading rather than route) for a guidance setpoint.

The task of the pilot responsible for the guidance of the airplane is to select the guidance setpoints and modes. Currently, he or she performs this task through the dedicated control unit (FCU or MCP) which is located between the two pilots, then he or she has to check the selection of his or her setpoints (values) on the primary flight screen which is located facing him or her (PFD, standing for Primary Flight Display) and/or on the navigation screens (ND, standing for Navigation Display in the lateral plane; VD, standing for Vertical Display in the vertical plane). Then, the guidance is monitored on these screens which indicate the behavior of the guidance:
summary of the behavior via the synthesis of the modes that are armed and engaged: FMA panel;
guidance setpoints (speed CAS, heading/route, altitude, vertical speed/gradient) and deviations in relation to the current parameters of the airplane: PFD screen;
margins in relation to the limits (for example, margin in relation to the minimum operational speed and stall speed): PFD screen.

This standard solution presents drawbacks, and in particular:
the pilot has to select the guidance setpoints and modes in one place (control unit FCU), then check and monitor the behavior of the airplane in another place (on the playback screens). This involves visual toing and froing and a dispersion of the guidance elements between the control and the playback of the behavior of the system;

the control unit is a physical item of equipment that is costly and difficult to modify (because it is of hardware type); and this control unit is bulky in the cockpit.

SUMMARY

The present invention relates to a dialog device between an operator, notably a pilot, of an aircraft and a guidance system of said aircraft, which makes it possible to remedy the abovementioned drawbacks.

To this end, according to the invention, said dialog device which is installed on the aircraft and which comprises at least one screen capable of restoring guidance information, is noteworthy in that said screen comprises at least one graphic object which is produced in the form of an interaction means which is associated with at least one guidance setpoint of said guidance system and which represents:

on the one hand, a playback element which indicates the value of the associated guidance setpoint of said guidance system; and on the other hand, a control element which can be grasped and moved along a curve by an operator so as to modify the value of said guidance setpoint.

Thus, by virtue of the invention, there is on the screen, for example of PFD, ND or VD type, at least one interaction means which is associated with a guidance setpoint of said guidance system and which not only makes it possible to restore the value of this guidance setpoint with which it is associated, but also enables an operator to modify this value on the screen. The control and the monitoring are combined, colocated.

The present invention can be applied to any guidance setpoint used by a guidance system and in particular to the following guidance setpoints: speed/mach, heading/route, altitude, vertical speed/gradient.

An interaction function (direct) is thus obtained on a screen (which was hitherto dedicated only to the playback of the flight parameters and guidance), through an interaction means (namely a graphic object allowing an interaction) associated with a guidance setpoint.

This interaction means can be grasped and moved by an operator along a curve (on a scale for example, which can appear dynamically and contextually when modifying a setpoint) so as to modify the associated guidance setpoint. By way of example, the invention can make it possible to grasp an interaction means indicating a heading setpoint, move it along a heading scale (a heading rose for example) to modify the heading setpoint so that the new heading setpoint is taken into account by the guidance system of the aircraft.

Said curve which is predefined can be a scale of values displayed by default or an independent curve on which a scale of values can appear dynamically and contextually.

The dialog device according to the invention, of interactive type, thus makes it possible:

for the pilot to select guidance setpoints (as well as guidance modes, as specified below) in the same place (screen) where he or she can check and monitor the behavior of the aircraft. This avoids the visual toing and froing and a dispersion of the guidance elements, which exist on the standard dialog devices; and in circumstances specified below, to do away with a control unit, for example of FCU type, which is an item of equipment that is costly, difficult to modify and bulky.

In a preferred embodiment, said interaction means comprises a plurality of states which allow different actions to be implemented. In this case, advantageously, said interaction means comprise states which allow at least some of the following different actions to be implemented:

modifying a guidance setpoint, called selected, which is directly applied by the guidance system;

modifying a preset guidance setpoint, which will be applied by the guidance system after validation;

engaging a capture or maintain mode for a selected guidance setpoint; and engaging a capture or maintain mode for a computed guidance setpoint (called "managed").

Furthermore, advantageously, the transition from one state to another of the interaction means is generated by a corresponding movement thereof.

Moreover, in a preferred embodiment, said dialog device comprises a plurality of interaction means, each of which is intended for a given guidance setpoint (speed/mach, heading/route, altitude, vertical speed/gradient) of said guidance system. The use of a plurality of interaction means, namely an interaction means for each guidance setpoint, on the screens dedicated to the playback of the flight parameters and of the guidance (PFD, ND, VD), makes it possible to directly implement on these screens all the functions of a standard physical control unit, for example of FCU type, and therefore to do away with such a control unit, which represents a significant saving in particular in terms of cost, weight and bulk.

In a particular embodiment, said dialog device comprises at least one interaction means, which is capable of controlling at least two different references (speed/mach, heading/route, vertical speed/gradient) of a guidance setpoint of said guidance system. This interaction means is capable of controlling only one reference at a time, and the selection of one of said references to be controlled depends on the movement of said interaction means (or on the action carried out to make it appear).

Moreover, advantageously, said interaction means is not displayed continuously on the screen, and it appears by placing a pointer (finger or cursor in particular) on the corresponding graphic object.

In the context of the present invention, said interaction means can be moved by a direct action. It is however also possible to envisage moving said interaction means by a so-called "lever arm" effect specified below.

In a preferred embodiment, said screen generates a dynamic visual feedback on a predicted trajectory associated with the guidance setpoint, which makes it possible to have directly on the same screen both a means for selecting the guidance setpoint, for restoring its value, and an indication of the effect generated on the trajectory of the aircraft. This embodiment is particularly advantageous operationally, since the pilot can immediately interpret the impact of his or her guidance setpoint modifications on the trajectory, and do so without the need for any visual toing and froing between a control panel and a playback screen.

Furthermore, in this case, advantageously:

said screen can automatically display at least one characteristic point of said predicted trajectory; and said interaction means is capable of acting on the characteristic point(s), thus displayed, of said predicted trajectory to modify them.

The present invention is applied to one or more screens, and preferably, to the abovementioned PFD, ND and VD screens.

In a first embodiment of the dialog device, said screen is a touch screen, and a graphic object is controlled by a direct contact, preferably finger contact, on the part of the operator on this touch screen.

Furthermore, in a second embodiment, the dialog device comprises, in addition to the screen, control means, such as a trackball or a touchpad in particular (of the multi-touch type or not), which are linked to the screen and which enable an operator to control the movement of a cursor on the screen, intended to act on the interaction means provided.

The present invention also relates to a guidance system of an aircraft, namely a flight director or an automatic piloting system, which comprises a dialog device such as that mentioned above, to enable a dialog between said guidance system and an operator, notably a pilot, of said aircraft.

The present invention also relates to an aircraft, in particular a transport airplane, which is equipped:

with such a dialog device; and/or
with such a guidance system.

BRIEF DESCRIPTION OF THE DRAWINGS

The figures of the appended drawing will give a good understanding of how the invention can be produced. In these figures, identical references designate similar elements.

FIGS. 2 to 16 schematically illustrate different actions that can be performed in accordance with the invention, by acting on an interaction means according to the invention.

DETAILED DESCRIPTION

Figure 1:
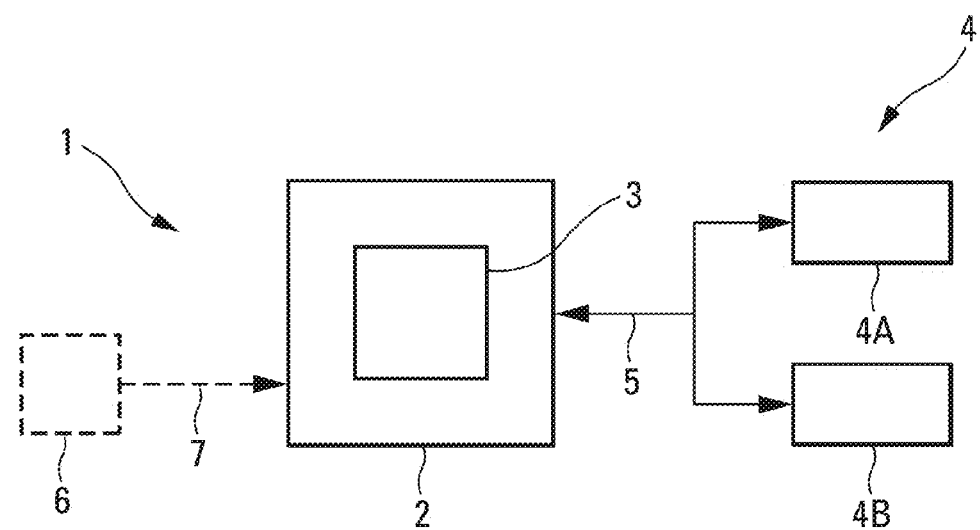
FIG. 1 is the block diagram of a dialog device according to the invention.

The dialog device 1 according to the invention and schematically represented in FIG. 1 is installed on an aircraft, in particular a transport airplane, not represented, and is, preferably, arranged in the cockpit of said aircraft. This dialog device 1 is intended to allow a dialog between at least one operator of the aircraft, notably a pilot, and a standard guidance system of said aircraft.

For this, said dialog device 1 which is installed on the aircraft comprises a display system 2 which comprises at least one screen 3 capable of restoring guidance information of said guidance system 4.

Said dialog device 1 may comprise one or more screens 3 and, preferably, at least one of the following screens:

a piloting screen of PFD (Primary Flight Display) type;
a navigation screen of ND (Navigation Display) type in relation to the lateral plane;
a navigation screen of VD (Vertical Display) type in relation to the vertical plane.

According to the invention, the screen 3 comprises at least one graphic object which is produced in the form of an interaction means 8. This interaction means 8 is associated with at least one guidance setpoint of the guidance system 4 and represents:

on the one hand, a playback element which indicates the value of this guidance setpoint of said guidance system 4, in conjunction with a scale of values; and on the other hand, a control element which can be grasped and moved along a curve by an operator, in particular the pilot of the aircraft, so as to modify the value of said guidance setpoint (of said guidance system 4).

To do this, the display system 2 comprising the screen 3 is linked via a link 5 to guidance means 4A and 4B of said guidance system 4, so as to be able to provide a communication of information between the two assemblies. Said guidance system 4 may comprise, as guidance means:

a standard flight director 4A, which computes piloting setpoints on the basis of guidance setpoints; and/or a standard automatic piloting system 4B, which makes it possible to follow guidance setpoints automatically.

Thus, by virtue of the dialog device 1 according to the invention, the operator has on the screen 3 at least one interaction means 8 which is associated with a guidance setpoint of said guidance system 4 and which not only makes it possible to restore the value of this guidance setpoint with which it is associated, but also enables this value to be modified on the screen 3.

The dialog device 1 according to the invention therefore allows a direct interaction on a screen 3 (which was hitherto dedicated solely to the playback of the flight parameters and guidance), through an interaction means 8 (namely a graphic object allowing an interaction) associated with a guidance setpoint.

In a first embodiment of the dialog device, said screen 3 is a touch screen, as represented in FIGS. 2 to 12, and a graphic object is controlled by the operator by a direct contact on the touch screen 3, preferably (but not exclusively) by a finger contact on the part of the operator, a finger 9 of whom is partially represented in some of these figures.

Furthermore, in a second embodiment, the dialog device 1 also comprises control means 6, represented by broken lines in FIG. 1 to show that they correspond to a possible variant, which are linked to the screen 3 (by a standard link 7 of wired or electromagnetic wave type) and which can be actuated manually by an operator so as to control the movement of a standard cursor (not represented) on the screen 3, intended to act on the interaction means 8.

These control means 6 may notably comprise:

a trackball;
a computer mouse; and/or
a touchpad (of multi-touch type or not).

The interaction means 8 can therefore be grasped and moved by an operator along a predefined curve (on a scale for example, which may appear dynamically and contextually when modifying a setpoint) so as to modify the associated guidance setpoint. Said curve may be a scale of values which is displayed by default, as represented in FIGS. 2 to 8, or an independent curve on which a scale of values may appear dynamically and contextually.

As an illustration, in FIGS. 2 to 8, the screen 3 is a navigation screen of ND (Navigation Display) type relating to the lateral plane. These FIGS. 2 to 8 show:

a symbol AC1 representing the current position of the aircraft equipped with the device 1;

symbols A1, A2, A3 representing the current positions of surrounding aircraft;

a distance scale 11 (in relation to the current position AC1 of the aircraft);

a heading scale 12 (a heading rose) with a symbol 13 indicating on the scale 12 the value of the current heading; and a continuous line plot 10 which illustrates the lateral trajectory followed by the aircraft.

Figure 2:
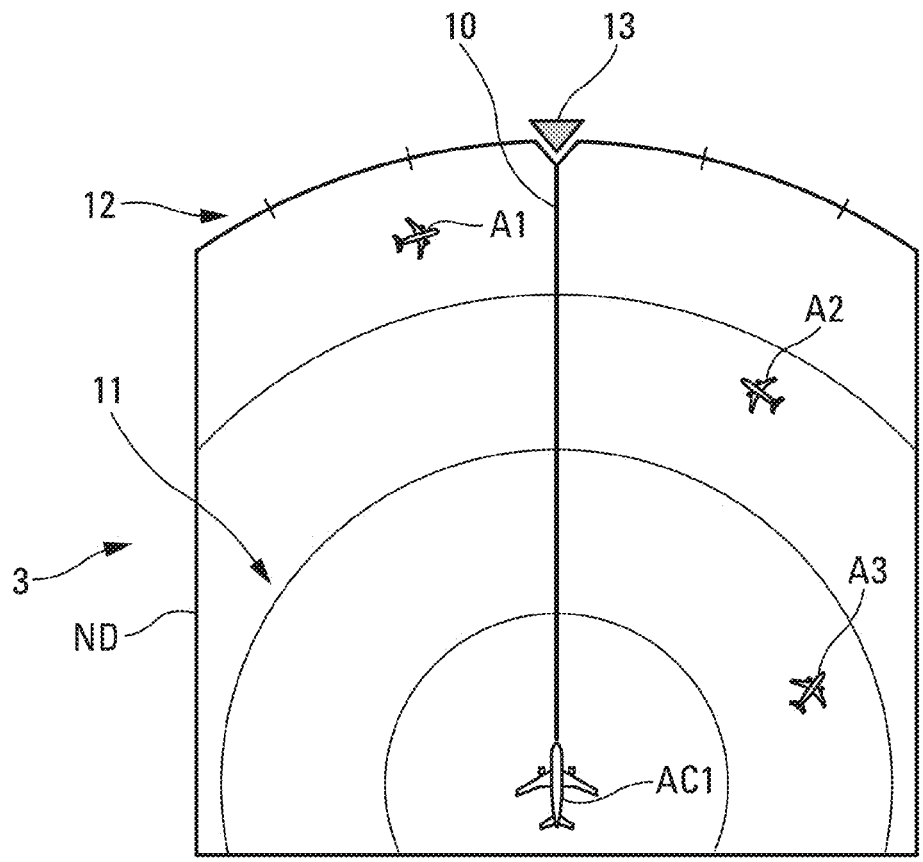
Figure 3:
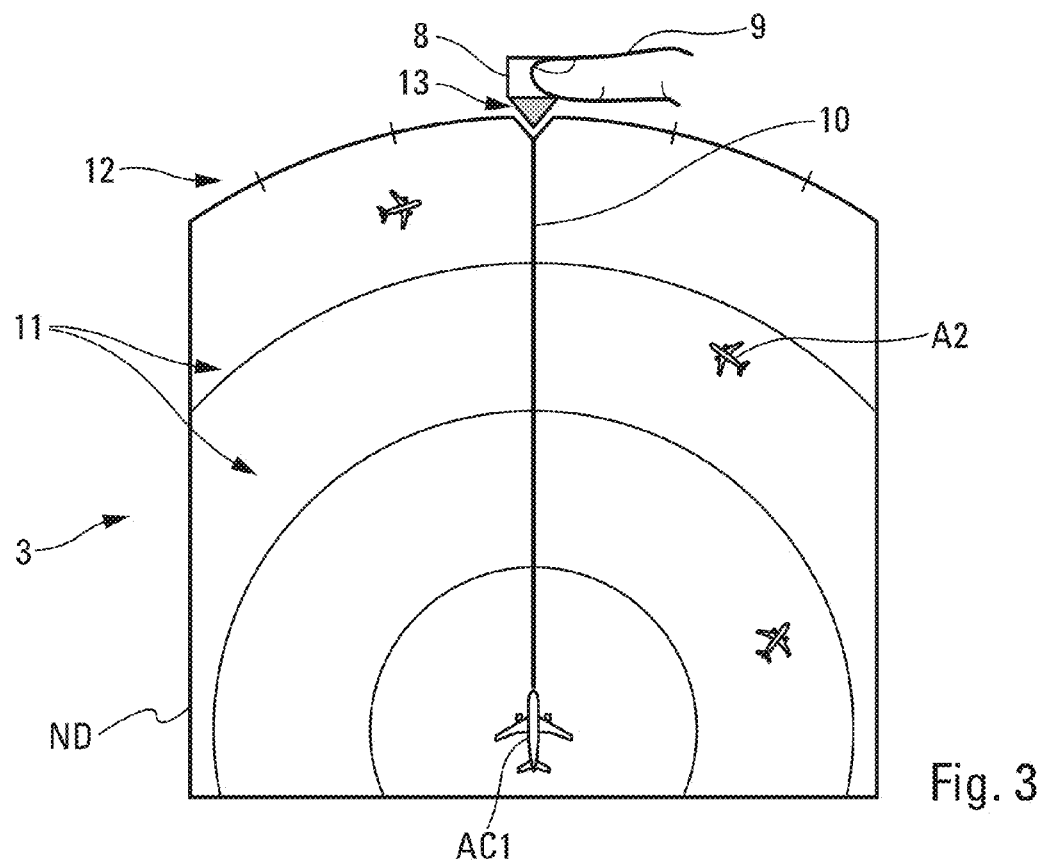
Figure 4:
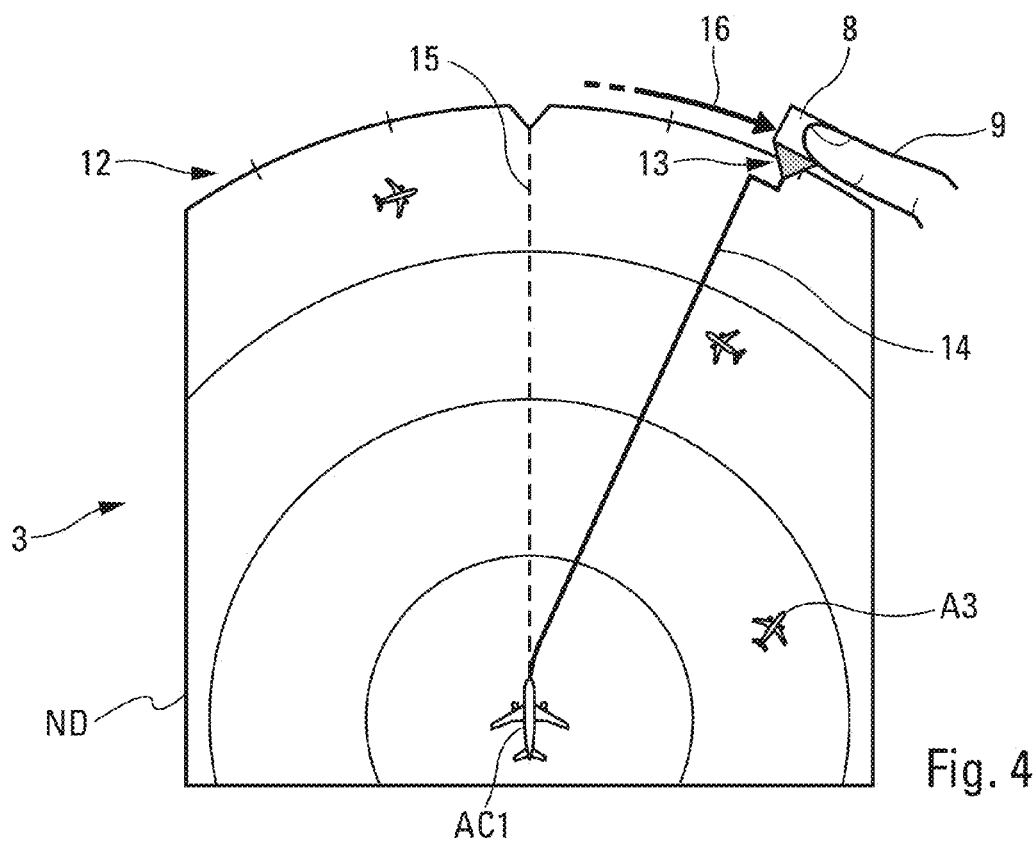
Figure 5:
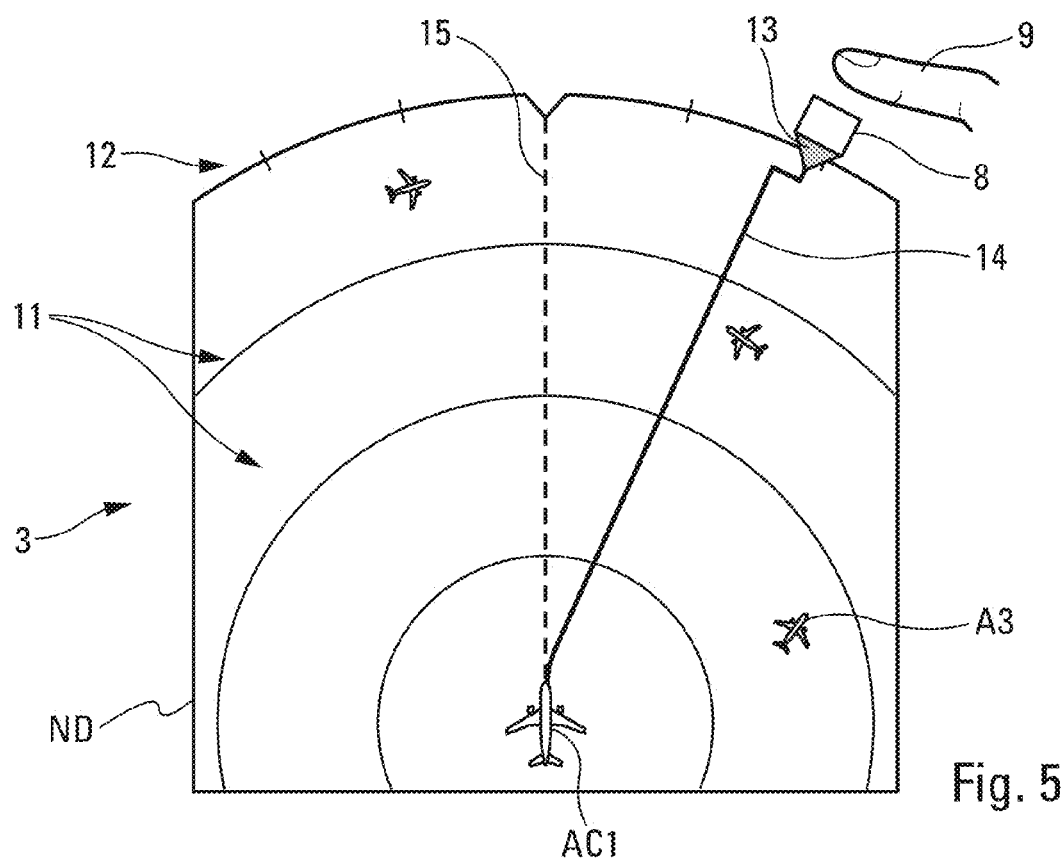
Figure 6:
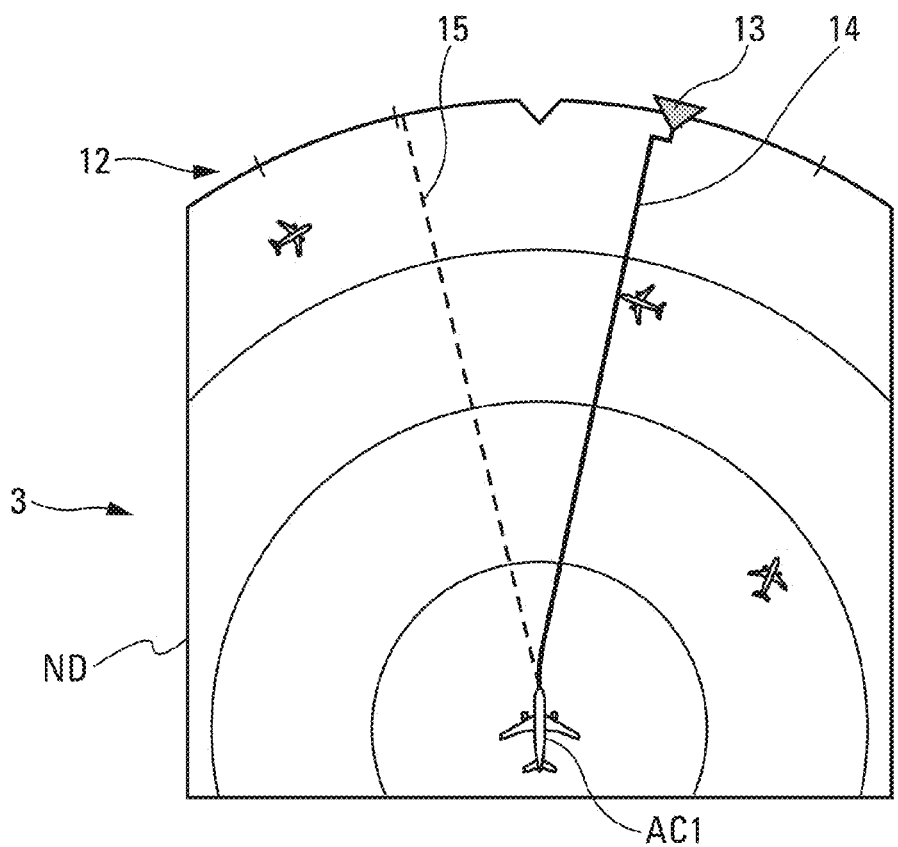

FIGS. 2 to 6 illustrate different successive situations when modifying a guidance setpoint of the guidance system 4, in this case a heading setpoint. More specifically:

FIG. 2 illustrates the initial situation before a modification;

in FIG. 3, an operator has placed a finger 9 on a graphic object of the screen ND, this finger contact with the screen ND causing an interaction means 8 to appear, intended to modify the heading setpoint of the aircraft;

the operator then moves the interaction means 8 with his or her finger 9, as illustrated by an arrow 16 in FIG. 4 so as to modify the heading value. A broken line plot 15 which illustrates the lateral trajectory according to the flight plan appears, and a plot 14 which indicates a predicted lateral trajectory follows the means 8, these plots 14 and 15 illustrating trajectory portions in the lateral plane;

in FIG. 5, the operator has released his or her finger 9 and the modification has been taken into account by the guidance system 4, the new heading is illustrated on the heading scale 12 by the symbol 13;

the aircraft will then progressively modify its heading (as illustrated in FIG. 6) to achieve this new heading.

The dialog device 1 according to the invention thus enables the pilot to select guidance setpoints (as well as guidance modes, as specified below) in the same place (screen 3) where he or she can check and monitor the behavior of the aircraft. This avoids the visual toing and froing and a dispersion of the guidance elements, which exist on the standard dialog devices. These comments also apply to the second embodiment using control means 6 since, in this case, the pilot visually follows, on the screen 3, the commands produced using these control means 6 (which are likely to be located separately from the screen 3).

The present invention also relates to a guidance system 4 of an aircraft, namely a flight director 4A or an automatic piloting system 4B, which comprises a dialog device 1 such as that mentioned above, to enable a dialog between said guidance system 4 and a pilot of said aircraft.

Moreover, in a preferred embodiment, said dialog device 1 comprises a plurality of interaction means 8, each of which is intended for a given guidance setpoint (speed/mach, heading/route, altitude, vertical speed/gradient) of said guidance system 4. The use of a plurality of interaction means 8, namely one interaction means for each guidance setpoint, on the screens 3 dedicated to the playback of the flight parameters and guidance (PFD, ND, VD), makes it possible to implement, directly on these screens 3, all the functions of a standard physical control unit, for example of FCU type, and therefore to dispense with such a control unit, which represents a significant saving, notably in terms of cost, weight and bulk.

In a preferred embodiment, said interaction means 8 comprises a plurality of states which allow different actions to be implemented. The transition from one state to another of the interaction means 8 is generated by a corresponding movement thereof. In this case, said interaction means 8 comprises states which allow at least some of the following different actions to be implemented:

modifying a guidance setpoint, called selected, which is applied by the guidance system 4;

modifying a preset guidance setpoint, which will be applied directly by the guidance system 4 after validation;

arming or engaging a capture or maintain mode for a selected guidance setpoint (selected mode); and engaging a capture or maintain mode for a guidance setpoint computed automatically in the usual manner (managed mode).

In a preferred embodiment, the interaction means 8 thus makes it possible to control the engagement (activation) of the associated guidance mode on the defined value (so-called selected mode) or on a value computed by the system according to certain criteria (so-called managed mode), and also the arming of a guidance mode.

In a particular embodiment, said interaction means 8 is not displayed continuously on the screen 3, and it appears on request by placing a pointing element on the corresponding graphic object (by a direct contact or by the positioning of a cursor), as illustrated in FIG. 3.

Furthermore, preferably, each interaction means 8 has the abovementioned states (not visible, modification directly taken into account for guidance, preset, request to arm or engage the managed mode) which can be accessed by a cursor movement (or by contact in touch mode). Preferably, the management of the interaction means 8 exhibits the following characteristics:

by default, the state of the interaction means 8 is invisible (only the playback of the setpoint value is displayed in the case where a setpoint exists);

the interaction means 8 appears on request, by placing the cursor (or a finger 9) on the graphic object representing the value of the guidance setpoint or the current value of the parameter;

consequently, the modification of the setpoint is possible by moving the interaction means 8 along a predefined curve. The guidance setpoint is then taken into account immediately;

if the pilot wants to preset the guidance setpoint (namely choose a value without activating it, and activate it only later, for example after validation of his or her request by air traffic control), he or she can access the presetting state by locating on the interaction means 8, by grasping it and by moving it appropriately, preferably backward (away from the scale or the curve of movement for the modification) so as to cause a different graphic state associated with the presetting to appear (which is highlighted by an appropriate color, for example yellow). Then, he or she can modify the presetting value by moving the interaction means 8 along the predefined curve (as for the guidance setpoint);

to actually activate a presetting, an appropriate movement of the interaction means 8, preferably toward the interior this time (toward the scale), causes the overlapping of the graphic object associated with the presetting, thus validating the value for the actual guidance of the aircraft; and to engage or arm the managed mode of the axis concerned (mode for which the guidance setpoint is computed automatically by the system according to predefined criteria), the interaction means 8 is pushed more toward the interior of the interface giving control to the system and causing a graphic object to be covered to validate the command to appear temporarily. In a particular embodiment, the releasing of the interaction means 8 should take effect at the end of travel of the movement required to validate the action. In this case, a releasing of the interaction means 8 before the end of the required movement has no effect.

In the context of the present invention, said interaction means 8 is preferably moved by a direct action. It is, however, also possible to envisage moving said interaction means by a so-called "lever arm" effect. In the latter case, an operator interacts with the graphic object representing the guidance setpoint (for example heading/route), not by a direct interaction on this object, but with a lever arm located diametrically opposite this setpoint representation, along the scale, notably in heading rose form, as illustrated by a dashed line 17 in FIG. 7 (which represents the same situation as FIG. 4) on a point of which acts a finger 9 whose movement is illustrated by an arrow 18, which provokes the movement of the interaction means 8 in the direction and the way illustrated by an arrow 20.

Moreover, in a particular embodiment, said dialog device 1 comprises at least one interaction means, which is capable of controlling at least two different references (speed/mach, heading/route, vertical speed/gradient) of a guidance setpoint of said guidance system 4. In this case, it is capable of controlling only one reference at a time, and the selection of one of said references to be controlled depends on the way in which the interaction means 8 is made to appear.

In the latter embodiment, the manner in which the interaction means 8 is made to appear therefore makes it possible to select the setpoint reference. For example, by bringing the interaction means over the heading scale 12 (FIG. 3), the status of the interaction means 8 making it possible to modify the heading setpoint is made to appear, whereas a summons from the interior of the heading scale 12 (FIG. 8 which illustrates the same situation as FIG. 3) causes the status of the interaction means 8 making it possible to select and modify a route setpoint to appear. In this way, it is possible to switch over from a heading reference to a route reference.

Moreover, by way of illustration, in FIGS. 9 to 16, the screen 3 is a navigation screen of VD (Vertical Display) type relating to the vertical plane. These FIGS. 9 to 16 notably show:

a symbol AC2 representing the current position of the aircraft equipped with the device 1; and an altitude scale 22.

Figure 9:
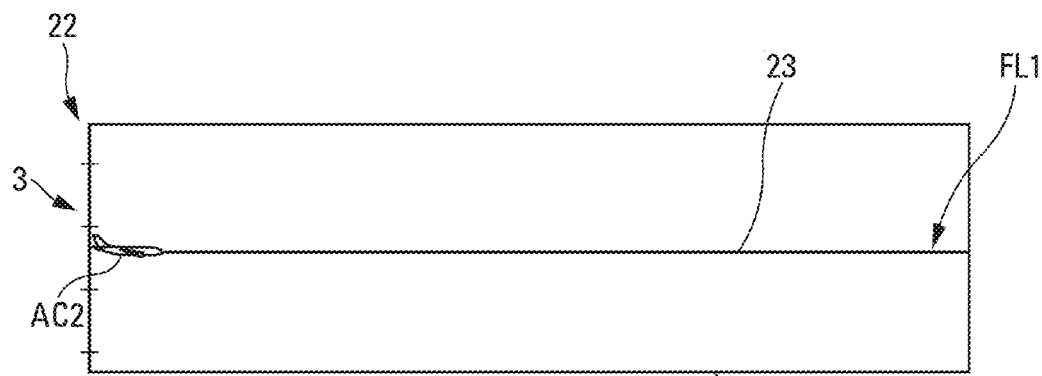
Figure 10:
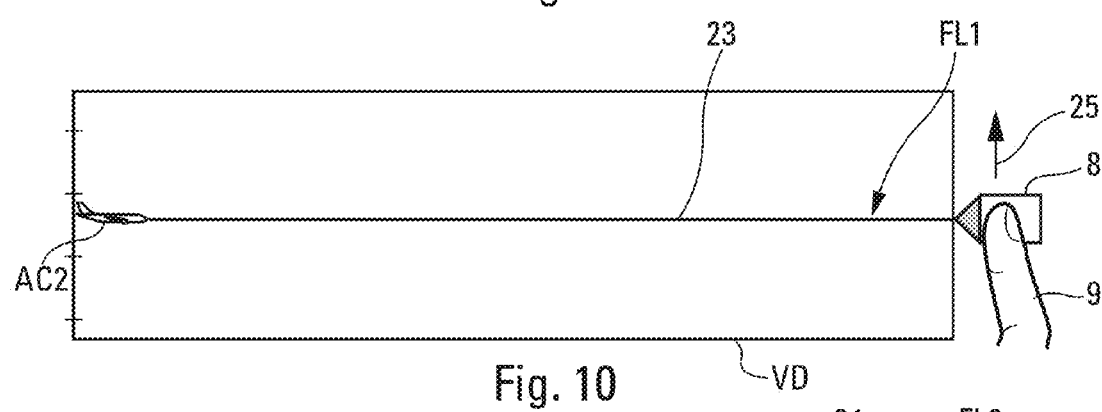
Figure 11:
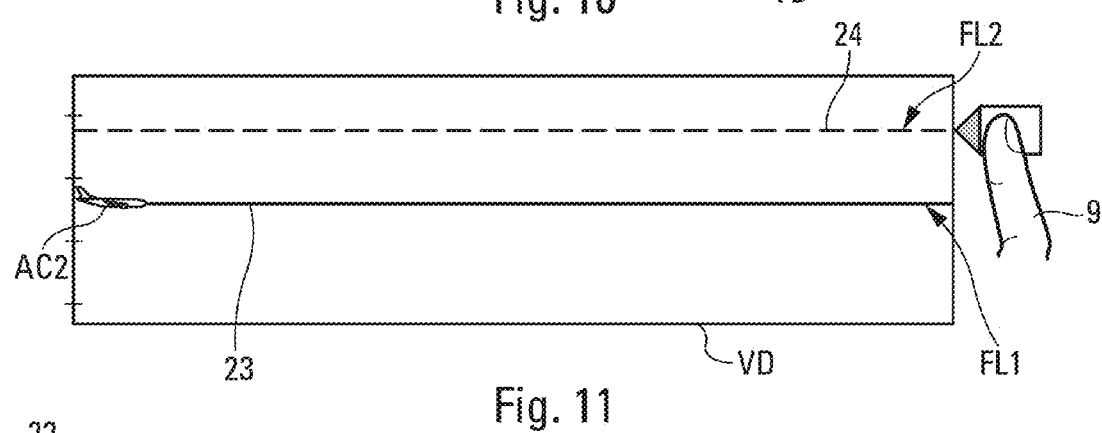
Figure 12:
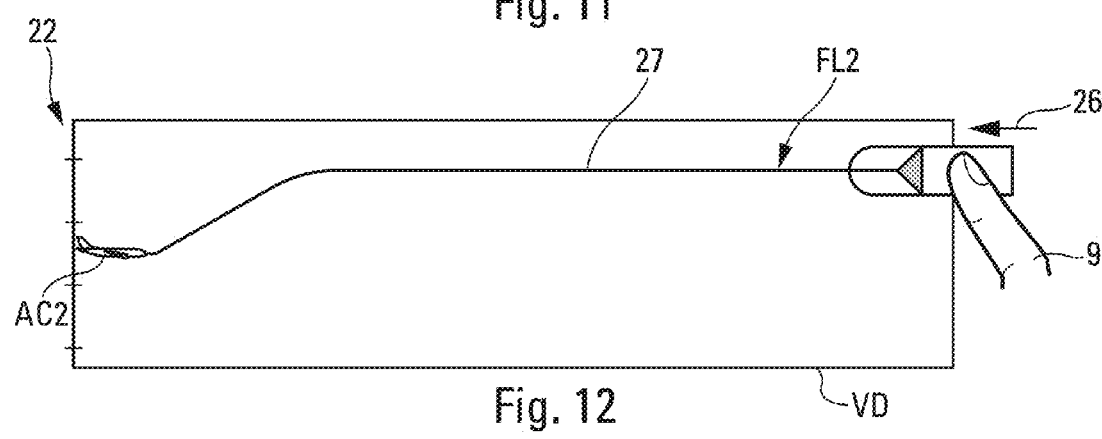

FIGS. 9 and 12 illustrate successive situations when modifying a guidance setpoint of the guidance system 4, in this case an altitude setpoint (or flight level), the aircraft initially being in a maintain altitude mode. More specifically:

in FIG. 9, the aircraft follows a vertical trajectory (plot 23) making it possible to maintain a flight level FL1;

in FIG. 10, an operator has brought a finger 9 over a graphic object so as to cause an interaction means 8 to appear making it possible to modify an altitude setpoint. The operator moves the interaction means 8, as illustrated by an arrow 25, so as to preset a new altitude setpoint;

this modification is made in a presetting mode so that the flight level to be set (which is represented by a broken line plot 24 in FIG. 11) is highlighted by a different color from that of the plot 23. Preferably, the plot 23 is green and the plot 24 is yellow;

the new altitude setpoint (to reach a flight level FL2 according to a trajectory 27) is taken into account by the guidance system 4 after the engagement of a climb mode (maintain speed CAS without altitude constraint), which is controlled by an appropriate movement (illustrated by an arrow 26) of the interaction means 8, as shown in FIG. 12.

Figure 13:
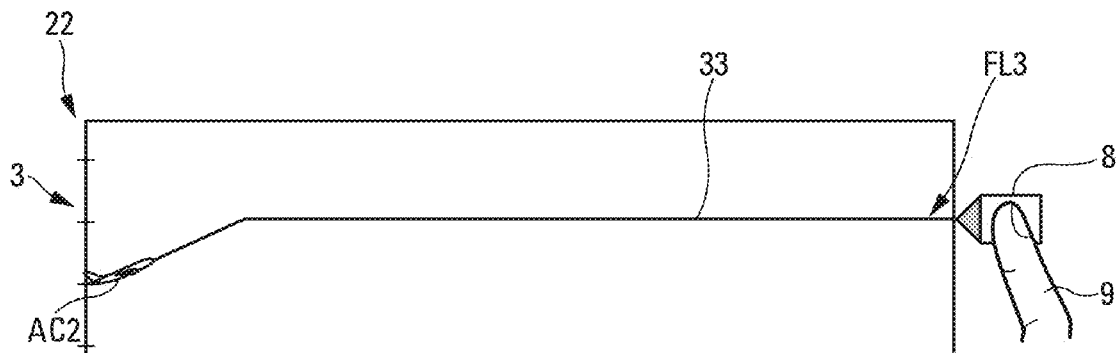
Figure 14:
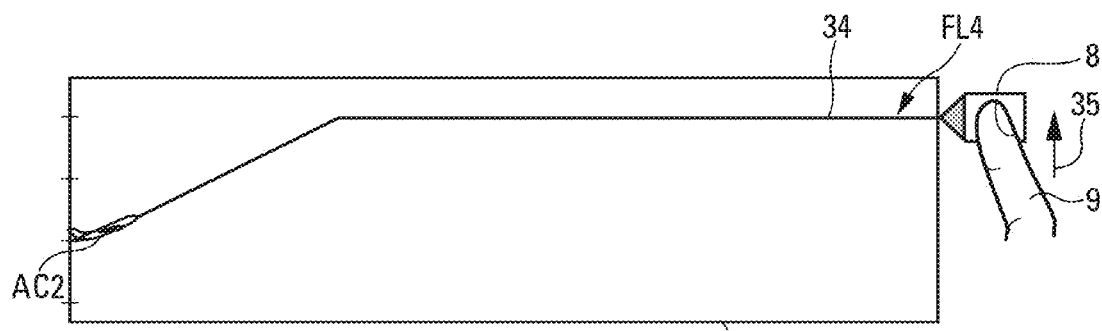
Figure 15:
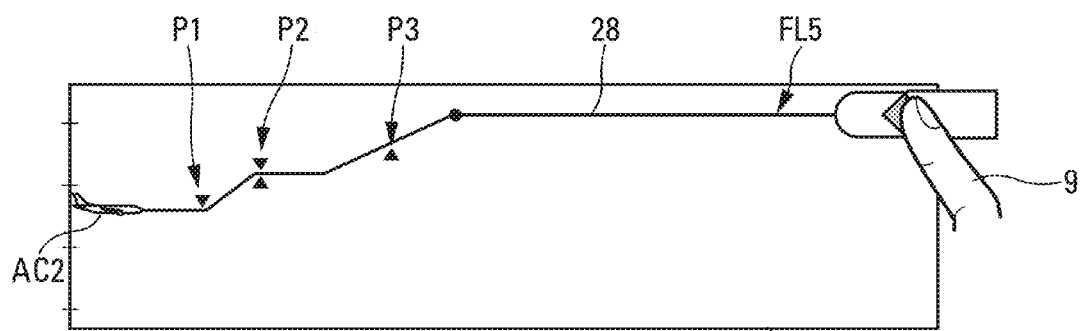

FIGS. 13 and 14 also illustrate successive situations when modifying a guidance setpoint of the guidance system 4, in this case an altitude setpoint (or flight level), but in this case the aircraft is initially (not in a maintain altitude mode) but in a climb to a flight level FL3 mode. More specifically:

in FIG. 13, the aircraft follows a vertical trajectory (plot 33) making it possible to reach a flight level FL3. Furthermore, in FIG. 13, an operator has brought a finger 9 over a graphic object so as to cause an interaction means 8 to appear making it possible to modify an altitude setpoint. This interaction means 8 appears directly at the level of said flight level FL3; and in FIG. 13, the operator moves the interaction means 8, as illustrated by an arrow 35, so as to make a modification to the altitude setpoint which is, in this case, immediately taken into account by the guidance system 4 (to reach a flight level FL4 according to a trajectory 34).

It is also possible to implement a climb mode to a setpoint altitude by observing a particular constraint, for example an altitude or geometrical profile constraint. As an illustration, in the example of FIG. 15, to reach a flight level FL5, the vertical trajectory 28 must comply with a plurality of altitude constraints, illustrated respectively by symbols P1, P2 and P3. In particular, the vertical trajectory 28 must pass:

under the altitude highlighted by the symbol P1;

through the point highlighted by the symbol P2; and over the altitude highlighted by the symbol P3.

Moreover, preferably, said screen 3 generates a dynamic visual feedback on a predicted trajectory associated with the guidance setpoint, which makes it possible to have directly on the same screen 3 both a means for modifying the guidance setpoint, for restoring the current value of the guidance setpoint, and an indication of the effect generated on the trajectory of the aircraft by a modification of the guidance setpoint. This is particularly advantageous operationally, since the pilot can immediately interpret the impact of his or her guidance setpoint modifications on the trajectory, and do so without requiring any visual toing and froing between a control panel and a playback screen.

Figure 16:
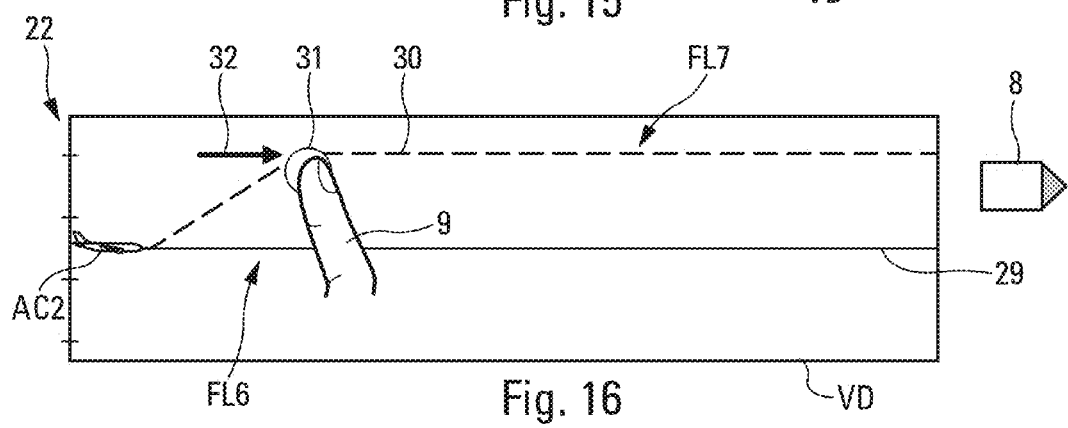

Furthermore, in the latter embodiment, said screen 3 may also display, automatically, at least one characteristic point 31 of said predicted trajectory 30 (FIG. 16). As an illustration, it may, for example, display the following characteristic points:

the point of intersection of its predicted heading/route trajectory with the flight plan;

the point of intersection of its predicted heading/route trajectory with the axis of the runway used for a landing;

the horizontal distance (in Nm) relative to the aircraft, of the point of capture of the setpoint altitude.

In a particular embodiment, the interactions are extended to the characteristic points of the display of the predicted trajectory of the preceding preferred embodiment. Thus, said interaction means is capable of acting on the displayed characteristic point or points of said predicted trajectory to modify them.

As an illustration, it is thus notably possible to carry out the following operations:

on the heading presetting, it is possible to delay the start of turn by pushing back, along the predicted trajectory for example, the representation (on the ND screen) of the point at which the taking into account of the heading presetting setpoint begins;

similarly, on the gradient/speed presetting, it is possible to delay the descent/climb start point by an interaction on the graphic representation of this point (on the VD screen);

it is possible to modify the vertical speed/gradient setpoint by an interaction on the end-of-climb/descent graphic representation.

As an illustration, in FIG. 16, the aircraft follows a vertical trajectory (plot 29) relative to a flight level FL6. Furthermore, an operator has caused a vertical trajectory (plot 30) relating to a presetting mode to appear. This trajectory is highlighted by a different representation (for example a different color) from that of the plot 29. Preferably, the plot 29 is green and the plot 30 is yellow. The operator then moves a characteristic point 31 of the trajectory 30, as illustrated by an arrow 32 so as to act on the setpoint altitude capture point thus modifying the vertical climb speed. He or she thus performs an interaction on this characteristic point 31 of the predicted trajectory 30. The new altitude setpoint (to reach the flight level FL7 according to the trajectory 30) is taken into account by the guidance system 4 after an engagement of a climb mode, which is controlled by an appropriate actuation of the interaction means 8.

The invention claimed is:

1. A dialog device between an operator of an aircraft and a guidance system of said aircraft, said dialog device being installed on the aircraft and comprising:

at least one visual display screen, wherein the screen is configured to visually display both a graphic element and an interactive element simultaneously, for co-locating the control and monitoring aspects of one or more guidance setpoints, wherein:

the graphic element comprises a symbol for visually representing a current value of at least one guidance setpoint; and the interactive element comprises:

a graphic playback element for visually indicating a value of at least one guidance setpoint in conjunction with a scale of values; and a graphic control element that is interactive and movable over a portion of the visual display screen, such that changes to the physical location of the graphic control element modify the current value of the at least one guidance setpoint;

wherein the visual display screen is a touch screen, wherein a location of the graphic control element is controlled by a direct contact with the touch screen, and wherein the graphic control element is configured to dynamically appear on the visual display screen by the direct contact with the touch screen.

2. The dialog device as claimed in claim 1, wherein the graphic control element enables visual selection of a plurality of different actions to be implemented.

3. The dialog device as claimed in claim 2, wherein the plurality of different actions to be implemented comprise:

modifying at least one guidance setpoint, called selected, which is applied by the guidance system;

modifying a preset guidance setpoint, which will be applied by the guidance system after validation;

engaging a capture or maintain mode for a selected guidance setpoint; and engaging a capture or maintain mode for a computed guidance setpoint.

4. The dialog device as claimed in claim 1, wherein the at least one guidance setpoint comprising an aircraft speed, mach, heading, route, altitude, speed, or gradient.

5. The dialog device as claimed in claim 1, wherein the at least one visual display screen comprises a plurality of graphic control elements, each of which is associated with a given guidance setpoint of said guidance system.

6. The dialog device as claimed in claim 1, wherein the visual display screen is configured to control at least two different references of a guidance setpoint of said guidance system or only one reference at a time via movement of the graphic control element.

7. The dialog device as claimed in claim 1, wherein the graphic control element is moved by a lever arm effect.

8. The dialog device as claimed in claim 1, wherein said visual display screen generates a dynamic visual feedback on a predicted trajectory associated with the current guidance setpoint.

9. The dialog device as claimed in claim 8, wherein said visual display screen automatically displays at least one characteristic point of said predicted trajectory.

10. The dialog device as claimed in claim 9, wherein the graphic control element is capable of acting on said characteristic point of said predicted trajectory.

11. The dialog device as claimed in claim 1, wherein a control is electrically linked to the visual display screen for enabling an operator to control the movement of a cursor on the screen, intended to act on the graphic control element.

12. A guidance system of an aircraft, wherein the system comprises a dialog device such as that specified in claim 1, to enable a dialog between said guidance system and an operator of said aircraft.

* * * * *